United States Patent
Wiggeshoff

(10) Patent No.: US 11,183,219 B2
(45) Date of Patent: Nov. 23, 2021

(54) MOVIES WITH USER DEFINED ALTERNATE ENDINGS

(71) Applicant: Sony Interactive Entertainment Inc., Tokyo (JP)

(72) Inventor: Elke Wiggeshoff, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/400,503

(22) Filed: May 1, 2019

(65) Prior Publication Data
US 2020/0349976 A1  Nov. 5, 2020

(51) Int. Cl.
G11B 27/036 (2006.01)
H04N 21/4402 (2011.01)
H04N 21/472 (2011.01)
G10L 15/16 (2006.01)

(52) U.S. Cl.
CPC ............ G11B 27/036 (2013.01); G10L 15/16 (2013.01); H04N 21/44029 (2013.01); H04N 21/47205 (2013.01)

(58) Field of Classification Search
CPC .................. G11B 27/036; G10L 15/16; H04N 21/44029; H04N 21/47205
See application file for complete search history.

(56) References Cited

U.S. PATENT DOCUMENTS

| | | | |
|---|---|---|---|
| 10,090,020 B1* | 10/2018 | Bentley | G11B 27/22 |
| 2005/0027529 A1* | 2/2005 | Manabe | G10L 25/93 704/249 |
| 2007/0011607 A1* | 1/2007 | Lazareck | G06F 40/186 715/201 |
| 2007/0162873 A1* | 7/2007 | Haro | G11B 27/105 715/838 |
| 2008/0016114 A1* | 1/2008 | Beauregard | G11B 27/10 |
| 2009/0216528 A1* | 8/2009 | Gemello | G10L 15/065 704/232 |
| 2011/0161348 A1* | 6/2011 | Oron | G06F 16/70 707/769 |
| 2012/0054813 A1* | 3/2012 | Carmichael | G06F 15/0291 725/110 |
| 2014/0380168 A1* | 12/2014 | Wu | G11B 27/34 715/723 |
| 2019/0325084 A1* | 10/2019 | Peng | G06F 3/011 |

FOREIGN PATENT DOCUMENTS

WO  WO-2014134801 A1 *  9/2014  ......... H04N 21/8549

* cited by examiner

Primary Examiner — Sunghyoun Park
(74) Attorney, Agent, or Firm — John L. Rogitz

(57) ABSTRACT

User engagement with movies is increased by enabling users to use their own vision, imagination, and creativity to generate user created alternate endings and/or sequences. In the context of movies presented through computer simulation consoles, the simulation community activity can be enhanced by providing the option of sharing user-customized creations as well as watching (and possibly rating) other user's creations.

21 Claims, 7 Drawing Sheets

MOVIES WITH USER DEFINED ALTERNATE ENDINGS

FIELD

The application relates generally to technically inventive, non-routine solutions that are necessarily rooted in computer technology and that produce concrete technical improvements. In particular, the present application relates to enabling users to define their own endings for movies.

BACKGROUND

Machine learning, sometimes referred to as deep learning, can be used for a variety of useful applications related to data understanding, detection, and/or classification.

SUMMARY

User engagement with movies is increased by enabling users to use their own vision, imagination, and creativity to generate user created alternate endings and/or sequences. In the context of movies presented through computer simulation consoles, the simulation community activity can be enhanced by providing the option of sharing user-customized creations as well as watching (and possibly rating) other user's creations.

Accordingly, an apparatus includes at least one processor and at least one computer storage that is not a transitory signal and that includes instructions executable by the at least one processor to receive, from a source of movies, at least one movie. The instructions are executable to receive input from at least one computer simulation console, and based at least in part on the input, generate an ending for at least one movie, with the ending being unique to the input.

In some embodiments the ending includes at least one cartoon. In other embodiments the ending includes at least one movie clip.

The input can include voice-generated input, at least one photograph, at least one video clip, and combinations thereof. The ending may be generated by at least one neural network (NN).

In another aspect, an assembly includes at least one processor and at least one computer storage with instructions executable by the processor to receive input from at least one computer simulation system. The instructions are executable to provide the input regarding at least one movie to an interpretation model including at least a first neural network (NN) to recognize voice signals of the input. The instructions also are executable to provide an output of the interpretation module to a sound module to recognize terms in the voice signals of the input, provide an output of the interpretation module to a building block module including at least a second NN to create scene elements for an ending of the movie, and provide an output of the interpretation module, an output of the building blocks module, and an output of the sound module to a composition module to generate the ending of the movie.

The processor may be embodied in a network server, a computer simulation console, or a computer simulation controller, or may be distributed among these components.

In another aspect, a method includes receiving voice input from an end user, receiving video and/or photographic input generated by at least one end user, and based at least in part on the voice input and the video and/or photographic input, generating at least one ending to a movie provided by a movie producer other than an end user. The ending may include at least one cartoon and/or at least one movie clip. Generating the ending to the movie can be done using an interpretation model including at least a first neural network (NN) to recognize voice signals, a sound module receiving an output of the interpretation module to recognize terms in the voice signals, a building block module including a second NN receiving output of the interpretation module to create scene elements for the ending of the movie, and a composition module receiving input from the interpretation module, the building blocks module, the sound module to generate the ending of the movie.

The details of the present application, both as to its structure and operation, can best be understood in reference to the accompanying drawings, in which like reference numerals refer to like parts, and in which:

DETAILED DESCRIPTION

Figure 1:
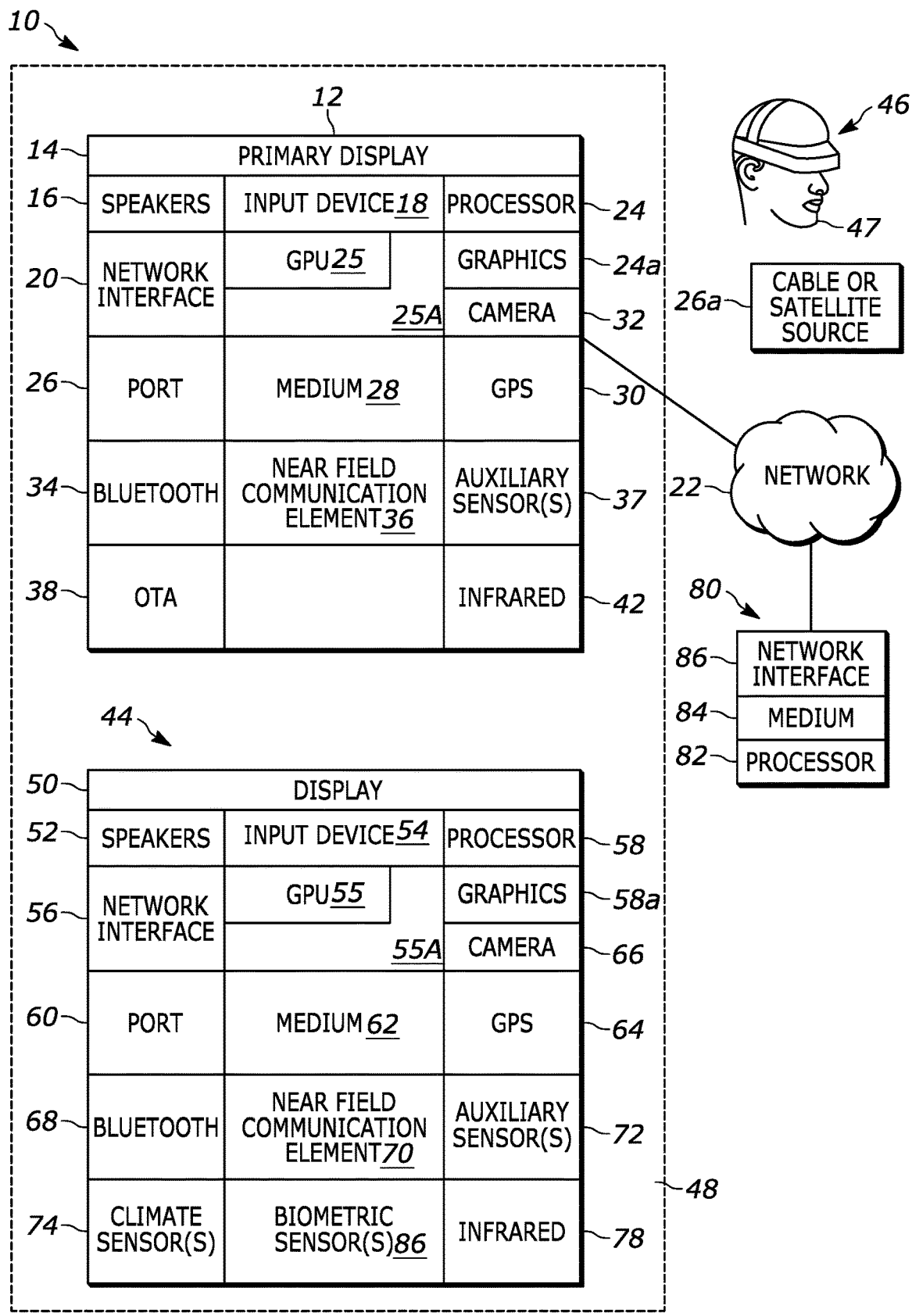
FIG. 1 is a block diagram of an example system consistent with present principles.

This disclosure relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, and artificial neural networks and machine learning applications.

A system herein may include server and client components, connected over a network such that data may be exchanged between the client and server components. The client components may include one or more computing devices including AR headsets, VR headsets, game consoles such as Sony PlayStation® and related motherboards, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more programs/applications, such as a browser made by Microsoft or Google or Mozilla or other browser program that can access websites hosted by the Internet servers discussed below. Also, an operating environment according to present principles may be used to execute one or more computer game programs/applications and other programs/applications that undertake present principles.

Servers and/or gateways may include one or more processors executing instructions that configure the servers to receive and transmit data over a network such as the Internet. Additionally, or alternatively, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate crowdsourced in accordance with present principles.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

As indicated above, present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, an augmented reality (AR) headset, a virtual reality (VR) headset, Internet-enabled or "smart" glasses, another type of wearable computerized device such as a computerized Internet-enabled watch, a computerized Internet-enabled bracelet, a computerized Internet-enabled music player, computerized Internet-enabled head phones, a computerized Internet-enabled implantable device such as an implantable skin device, other computerized Internet-enabled devices, etc. Regardless, it is to be understood that the AVD 12 is configured to undertake present principles (e.g., communicate with other consumer electronics (CE) devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors. Thus, the interface 20 may be, without limitation, a Wi-Fi transceiver, which is an example of a wireless computer network interface, such as but not limited to a mesh network transceiver. Furthermore, note the network interface 20 may be, e.g., a wired or wireless modem or router, or other appropriate interface such as, for example, a wireless telephony transceiver, or Wi-Fi transceiver as mentioned above, etc.

It is to be understood that the one or more processors control the AVD 12 to undertake present principles, including the other elements of the AVD 12 described herein such as controlling the display 14 to present images thereon and receiving input therefrom. The one or more processors may include a central processing unit (CPU) 24 as well as a graphics processing unit (GPU) 25 on a graphics card 25A.

In addition to the foregoing, the AVD 12 may also include one or more input ports 26 such as, e.g., a high definition multimedia interface (HDMI) port or a USB port to physically connect (e.g., using a wired connection) to another consumer electronics (CE) device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to, e.g., receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to, for example, determine the location of the AVD 12 in all three dimensions.

Continuing the description of the AVD 12, in some embodiments the AVD 12 may include one or more cameras 32 that may be, e.g., a thermal imaging camera, a digital camera such as a webcam, an infrared (IR) camera, and/or a camera integrated into the AVD 12 and controllable by the processor 24 to generate pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other consumer electronics (CE) device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR or VR headset worn by a user 47 as shown. In the example shown, only two CE devices 44, 46 are shown, it being understood that fewer or greater devices may also be used in accordance with present principles.

In the example shown, all three devices 12, 44, 46 are assumed to be members of a network such as a secured or encrypted network, an entertainment network or Wi-Fi in, e.g., a home, or at least to be present in proximity to each other in a certain location and able to communicate with each other and with a server as described herein. However, present principles are not limited to a particular location or network unless explicitly claimed otherwise.

The example non-limiting first CE device 44 may be established by any one of the above-mentioned devices, for example, a smart phone, a digital assistant, a portable wireless laptop computer or notebook computer or game controller (also referred to as "console"), and accordingly may have one or more of the components described below. The second CE device 46 without limitation may be established by an AR headset, a VR headset, "smart" Internet-enabled glasses, or even a video disk player such as a Blu-ray player, a game console, and the like. Still further, in some embodiments the first CE device 44 may be a remote control (RC) for, e.g., issuing AV play and pause commands to the AVD 12, or it may be a more sophisticated device such as a tablet computer, a game controller communicating via wired or wireless link with a game console implemented by another one of the devices shown in FIG. 1 and controlling video game presentation on the AVD 12, a personal computer, a wireless telephone, etc.

Accordingly, the first CE device 44 may include one or more displays 50 that may be touch-enabled for receiving user input signals via touches on the display 50. Additionally, or alternatively, the display(s) 50 may be an at least partially transparent display such as an AR headset display or a "smart" glasses display or "heads up" display, as well as a VR headset display, or other display configured for presenting AR and/or VR images.

The first CE device 44 may also include one or more speakers 52 for outputting audio in accordance with present principles, and at least one additional input device 54 such as, for example, an audio receiver/microphone for entering audible commands to the first CE device 44 to control the device 44. The example first CE device 44 may further include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as, e.g., controlling the display 50 to present images thereon and receiving input therefrom. Furthermore, note that the network interface 56 may be, for example, a wired or wireless modem or router, or other appropriate interface such as a wireless telephony transceiver, or Wi-Fi transceiver as mentioned above, etc.

Still further, note that in addition to the processor(s) 58, the first CE device 44 may also include a graphics processing unit (GPU) 55 on a graphics card 55A. The graphics processing unit 55 may be configured for, among other things, presenting AR and/or VR images on the display 50.

In addition to the foregoing, the first CE device 44 may also include one or more input ports 60 such as, e.g., a HDMI port or a USB port to physically connect (e.g., using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to, e.g., receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to, e.g., determine the location of the first CE device 44 in all three dimensions.

Continuing the description of the first CE device 44, in some embodiments the first CE device 44 may include one or more cameras 66 that may be, e.g., a thermal imaging camera, an IR camera, a digital camera such as a webcam, and/or another type of camera integrated into the first CE device 44 and controllable by the CE device processor 58 to generate pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first CE device 44 may include still other sensors such as, for example, one or more climate sensors 74 (e.g., barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more solid state storage drives (SSDs). The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as a wireless telephony transceiver. The network interface 86 may be a remote direct memory access (RDMA) interface that directly connects the medium 84 to a network such as a so-called "fabric" without passing through the server processor 82. The network may include an Ethernet network and/or fiber channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm", and may include and perform "cloud" functions such that the devices of the system 10 may access a "cloud" environment via the server 80 in example embodiments for, e.g., domain adaptation as disclosed herein. Additionally, or alternatively, the server 80 may be implemented by one or more game consoles or other computers in the same room as the other devices shown in FIG. 1 or nearby.

Figure 2:
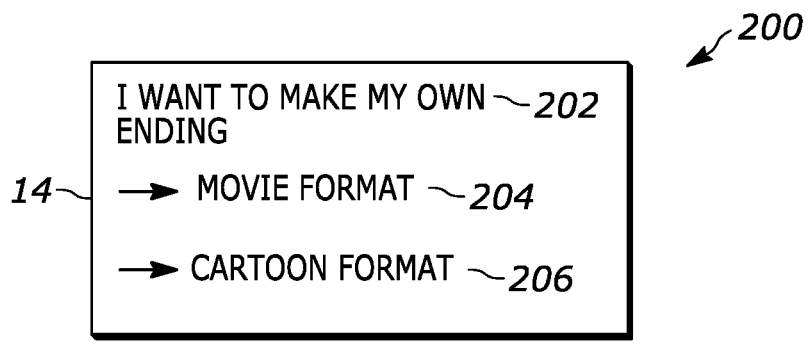
FIG. 2 is a screen shot of an example user interface (UI) permitting a user to select whether to generate a user-customized personalized movie ending or comic-format ending for a movie.

FIG. 2 illustrates an example user interface (UI) 200 consistent with present principles for allowing an end user to select whether personalized movie endings created by the end user and added to a movie received from a movie source such as a broadcaster or Internet source are to be in film (movie) format or simpler comic format. "Cartoon" may refer to a single panel image hand drawn or graphically produced as opposed to a frame of filmed video, typically used to convey an idea. A comic is a story told using sequential panel images. Sometimes the terms cartoon strip or comic strip are used interchangeably to describe a hybrid of the two. While "cartoon" is used below it is to be understood that present principles contemplate a series of cartoons as in an animated comic stream.

A prompt 202 may be presented to indicate to the user to make his or her own personalized movie ending. A movie selector 204 may be selected to cause the ending that is generated in accordance with disclosure below to be in movie or film format. A cartoon format selector 206 may be selected to cause the ending that is generated in accordance with disclosure below to be in cartoon format, in which, instead of frames of filmed video, cartoon drawings are generated and collated into the personalized movie ending replacing comic typical speech bubbles with spoken text/dialogues in the voice of the according character.

Figure 3:
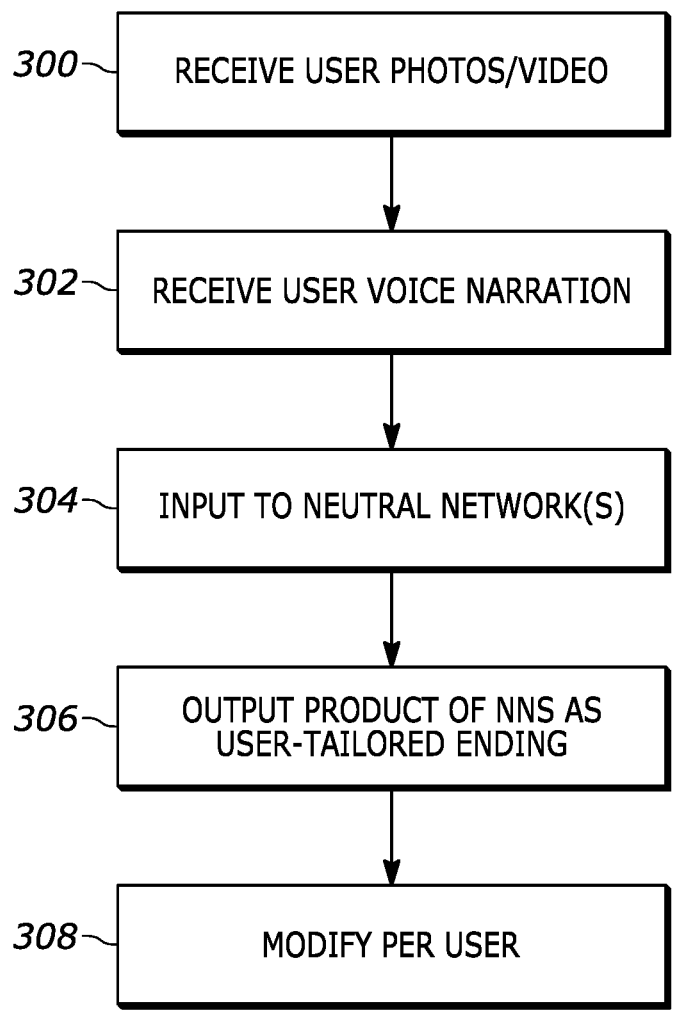
FIG. 3 is a flow chart of example logic consistent with present principles.

FIG. 3 illustrates the overall logic flow of the personalized movie ending generation techniques described further below. The logic of FIG. 3 may be executed by a personal computer, an Internet server such as a computer simulation server, a computer simulation console such as a PlayStation® console, etc.

Commencing at block 300, photographs and/or video are received from the end user, e.g., by the end user loading a video file into the computer that executes the techniques below. These photos and videos are used to generate objects and background in the personalized movie ending to be generated. The photos, for example, may be of objects that the user wishes to be in the personalized movie ending (cartoon style), while the video may be of background and to generate a 3d object models that the user wishes to be incorporated into the personalized movie ending.

Proceeding to block 302, user voice signals are received and digitized. These voice signals may establish a narration of the plot of the personalized movie ending. They may also establish dialog to be used in the movie ending, as well as describing the set of a movie scene or a single comic picture arrangement.

Moving to block 304, the inputs received at blocks 300 and 302 are input to the below-described neural networks (NN). The NN learn appropriate clips to generate based on the original movie as modified or extended by the user inputs to generate the personalized movie ending for the user. The personalized movie endings are output at block 306, e.g., by automatically, after generation, appending a personalized movie ending to a general release feature movie that is provided to a wide audience. Block 308 indicates that the movie ending may be modified by the user after viewing by inputting additional narration and/or photos of objects, videos of backgrounds, etc. To be able to more easily and precisely edit the personal movie ending, the movie editing process may be segmented into single scenes (for the movie version) and images (for the cartoon version). This way a segment can be fully edited until the editor is satisfied, before moving to the next one.

Techniques below enable movie watchers to actively influence the course of the story of a movie by using their imagination, vision, and creativity to create an alternate ending or a sequence. Also, end users can be offered the opportunity to share their content with others as well as watch (and possibly rate/comment) other users' creations.

The tool for creating such content is easily usable by the user and as mentioned above, functions primarily with the user's speech input so it can be directly used where the user watched the movie without requiring expert knowledge. However, it can be optionally extended by the use of the object/background scanning module to create an even more unique ending.

As discussed above, two possible output formats of the user created content may be offered, namely, a movie style video (high expectations: movie quality) and a comic or cartoon style image slide show with background audio of the spoken text or other sound in the scene.

The user narratively conveys the content of the scene, using descriptive image generation and narrative scene description, also speaking the text for the characters to say. The user can influence composition of a movie (or image of a scene for the comic style) by directing options.

Figure 4:
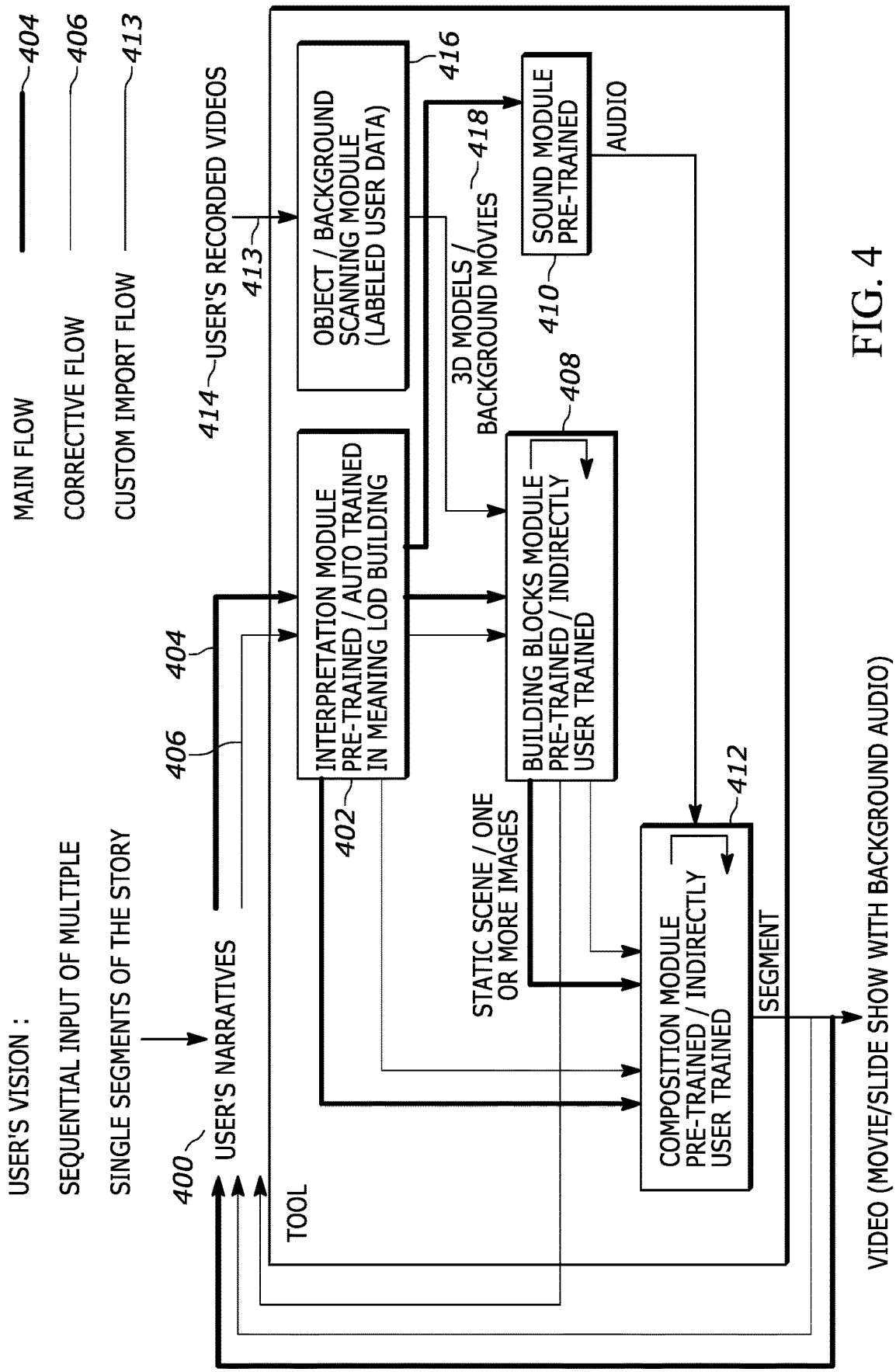
FIG. 4 is a block diagram of a personalized movie ending generation system.

FIG. 4 illustrates an architecture for generating personalized movie endings. The user's single segment narratives 400, received at block 302 in FIG. 3, are processed through a pre-trained interpretation module 402 first. Note that in FIG. 4, bold, thick lines 404 represent a main information flow while thinner lines 406 represent corrective or learning information flow. The complete flow is passed through once per generated segment of the output format.

The interpretation module 402 analyzes the content of the spoken words and separates the spoken words into three main instruction areas, which are provided to three respective modules, namely, a building blocks module 408, a sound module 410, and a final composition module 412, which also receives input from the building blocks module 408 and sound module 410 as shown. Further, lines 413 illustrate a custom data import flow in which the end user's videos 414 may be provided to an object/background scanning module 416 to output additional 3D models and background movies 418 that are provided to the building blocks module 408. The building blocks module 408 can directly access the custom content 418 alongside any content provided by the original makers of the movie. In general, the interpretation model 402 includes at least a first neural network (NN) to recognize voice signals of the input 400, while the sound module 410 recognizes terms in the voice signals of the input. The building block module 408, optionally extended by elements generated by the object/background scanning module 416, creates scene elements for an ending of the movie and the composition module 412 generates the ending of the movie. All of the modules in FIG. 4 may be established by one or more NNs, such as convolution NNs (CNNs), recurrent NNs (RNNs) such as long short-term memory (LSTM networks), and combinations thereof.

Modules shown in FIG. 4 such as, e.g., the building blocks module 408 and the composition module 412 can be pre-trained as well as indirectly trained using a feedback loop that allows the user to add more narratives to manipulate the output suggestions of those models.

Figure 5:
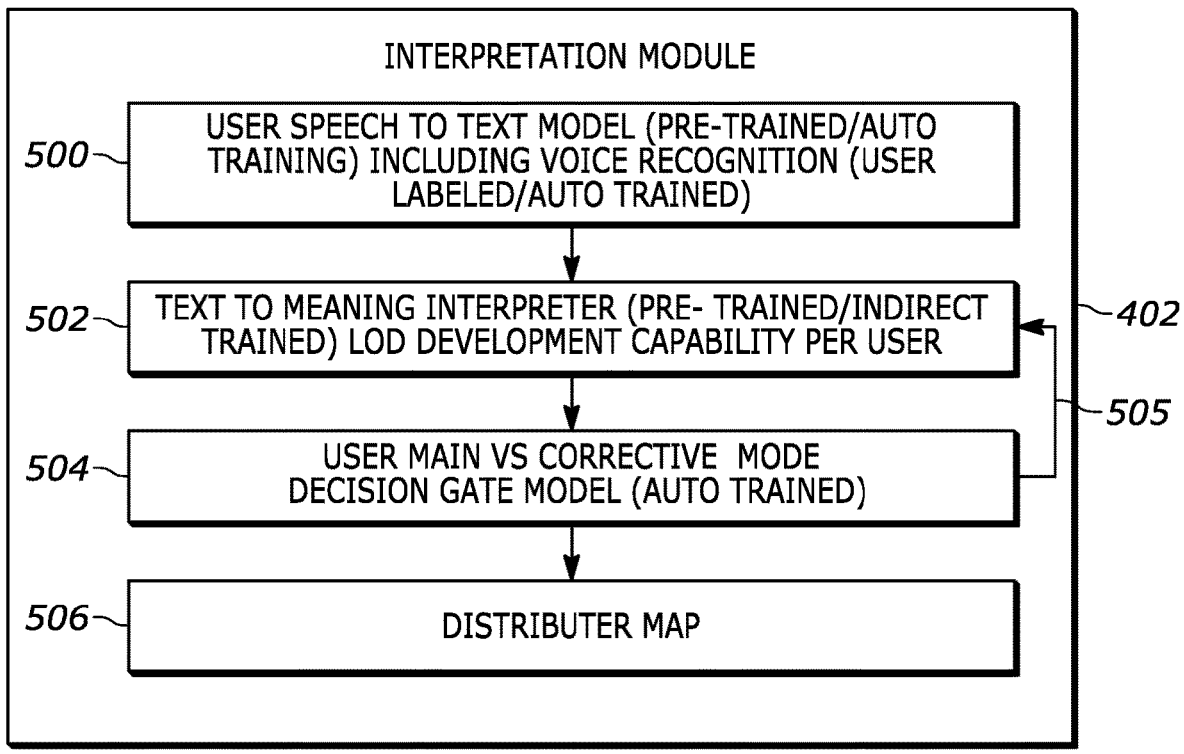
FIG. 5 is a schematic diagram illustrating the interpretation module of FIG. 4.

FIG. 5 illustrates further details of the interpretation module 402 shown in FIG. 4. A user text-to-speech module 500, which may be pre-trained, and which may also accept additional passive training from user interaction to adopt the different users' speech characteristics such as accents, sentence structures, and grammar abnormalities receives the input speech signals and converts the speech signals to recognized words. The module 500 may, in addition to recognizing speech, execute speaker recognition to identify the user inputting the speech. Speaker recognition may be executed using tonal, frequency, and other patterns in the input signals as a "fingerprint" such that the entire movie ending generation may be associated with the particular user inputting the speech.

The output of the speech-to-text module 500 is sent to an interpreter module 502, which interprets the content of text and assigns a specific context and meaning to it. This module may be trained using a ground truth set of terms and associated contexts and meanings, e.g., "rain" indicates a dark context with shiny surfaces to mimic wet surfaces, "sunny" indicates a bright scene with brighter locations to indicate reflections of sunlight, "crying" indicates a context that a face of a character should be rendered with a sad appearance, etc. The interpreter module 502 can also group differently narrated commands with the same content into one unified command for easier processing in the following modules. Levels of details (LOD) auto training may be used, such as provided by Unity Laboratories, prior to sending output to the building block module 408 and composition module 412.

A decision gate module 504 receives output from the interpreter module 502 and compares the output to previous commands to decide whether the output is a correction of an existing task or a new task. This outcome may trigger a learning cycle on the meaning interpreter if a correction is detected, as indicated by the feedback line 505.

The output of the module 504 is provided to a distributor map module 506 which distributes the output to the correct endpoint (i.e., to the building block module 508, the sound module 410, or the composition module 412) for further processing. For example, speech input classified as narrations describing what characters would say or any other sounds are directed to the sound module 410, whereas the composition module 412 receives from the interpretation module 402 instructions for the final composition, some of which cannot be influenced by the user and are fully automated, some of which are automatically injected (but can still be influenced by the user through a correction pass—automatized suggestion), and some are required to be explicitly defined by the user instructions—custom. Examples of this include voice input classified as instructions for layering/relative positioning of generated images to be merged into a single image of the slideshow (separate images for background, extras, actors) (for comic style, automatized suggestion). Examples also include voice input classified as instructions for camera position/viewpoint/movement/zoom (for movie, automatized suggestion). Further examples include voice input classified as instructions for speech timing (for movie, custom) and mouth movement for speaking characters (for movie, automatized). Additional examples include object/character animation (for movie, custom), collision detection (for movie, automatized), and size proportions between objects (for both, automatized suggestion).

Because of the tool supporting a corrective flow path, the text to meaning interpreter 504 receives indirect user-triggered training.

Figure 6:
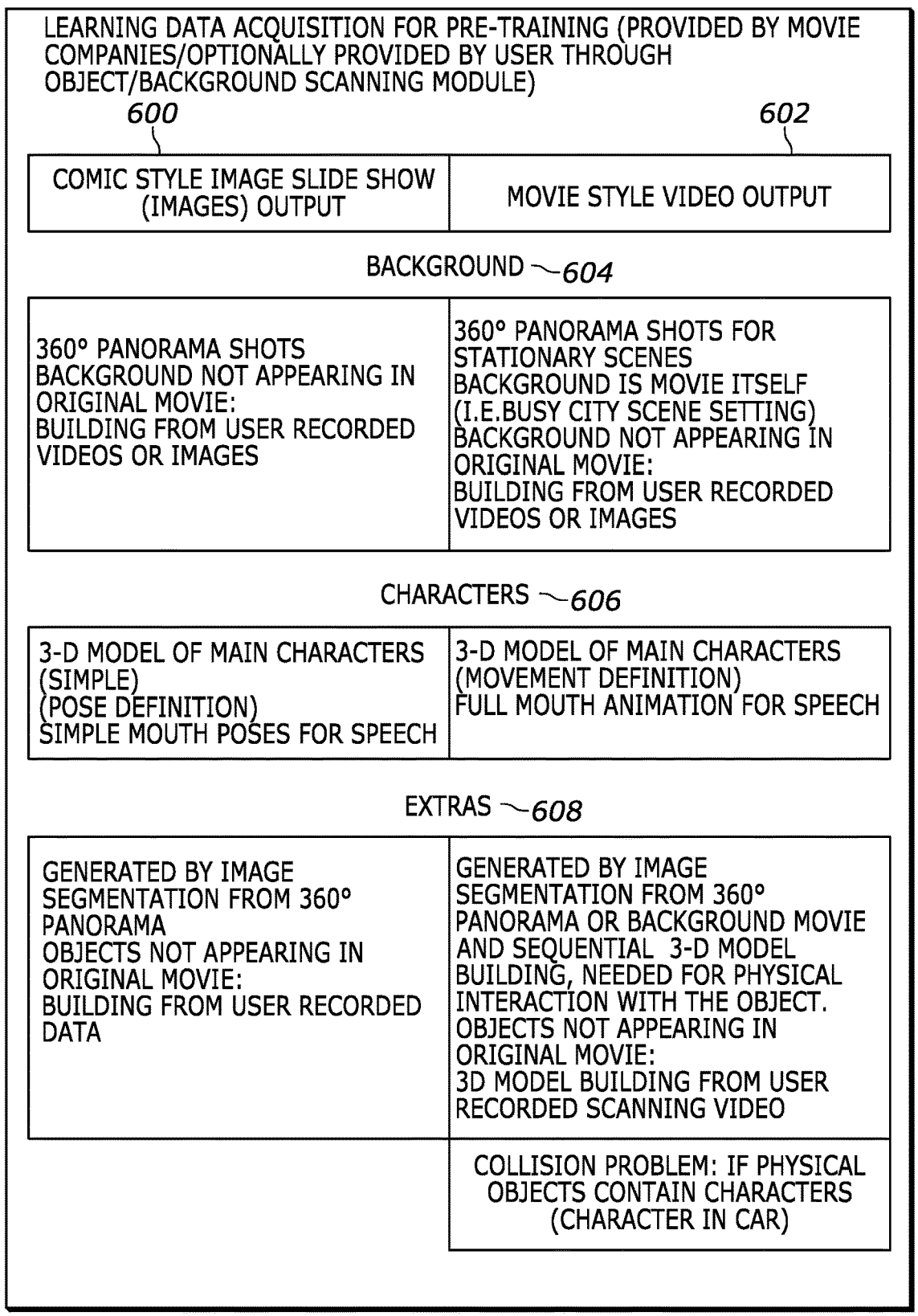
FIG. 6 is a schematic diagram illustrating the training phase of the building blocks module of FIG. 4.
Figure 7:
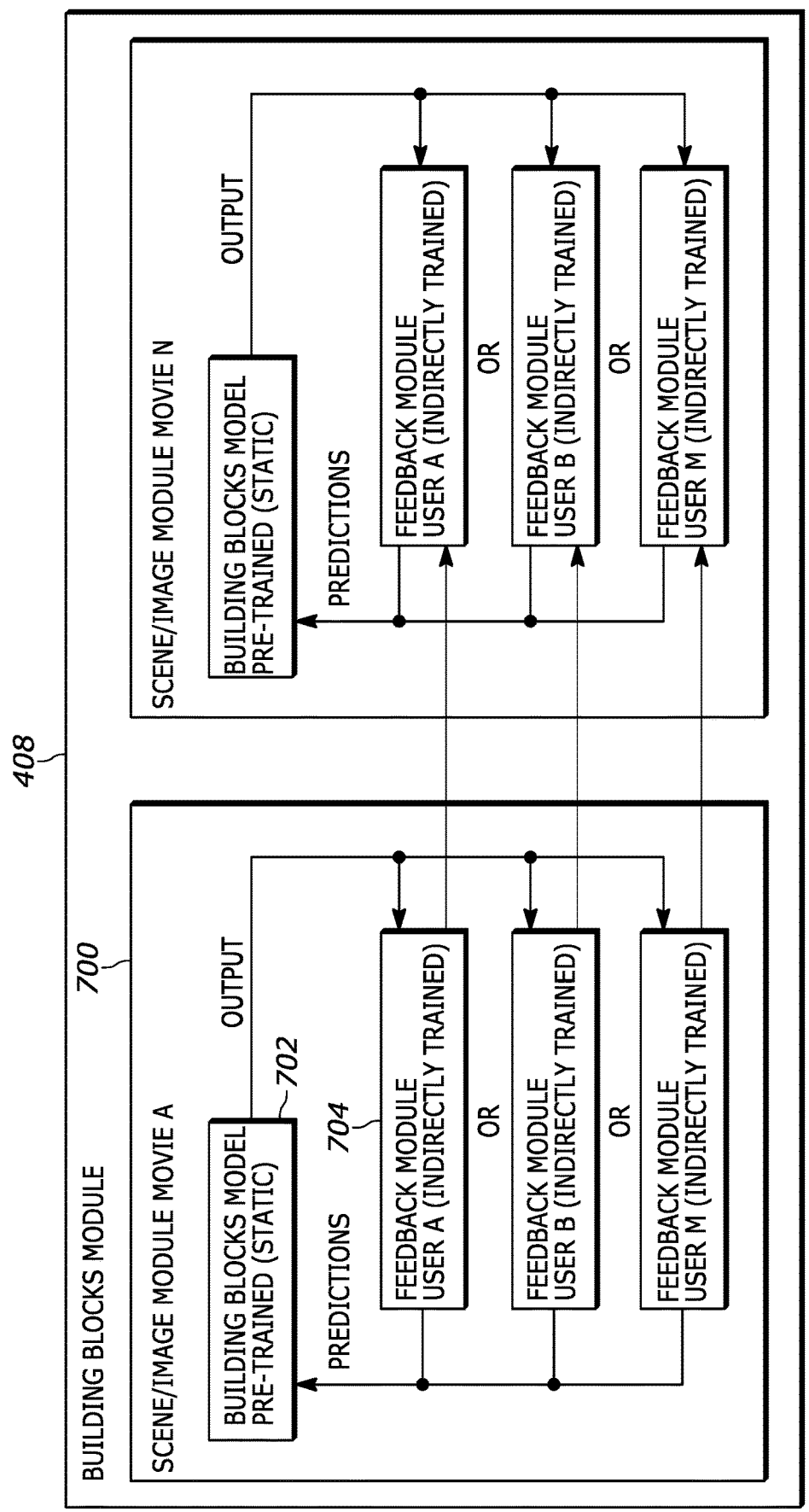
FIG. 7 is a schematic diagram of the building blocks module of FIG. 4.

FIGS. 6 and 7 illustrate details of the building block module 408 in FIG. 4. The building blocks module 408 generates either an image (or images) for a slide show with background audio version or a complete scene for the movie variation. In some examples the building blocks module 408 may be specific to the commercial movie being augmented by the personalized movie ending and may evaluate three areas of data.

FIG. 6 illustrates, with a left-hand column 600 indicating learning data for a cartoon-style slide show movie ending and a right-hand column 602 indicating learning data for a movie style movie ending. Generally, this data is provided by the movie production company on a per movie basis but can be expanded by user generated additions. As shown at 604 in FIG. 6, one of the three areas of data on which the building blocks module 408 is trained can be a background category. The background category data can include data representing background shots, in 360-degree panorama if desired, as may be input by a user's video at block 300 in FIG. 3. This information may be used both in the cartoon version in the left-hand column 600 and the movie version in the right-hand column 602. Additionally, for movie style personalized movie endings, the background may be derived from the original movie itself, or from a user's video.

The building blocks module 408 also may be trained on character data 606. This data may include three dimensional models of the main characters (as derived from, e.g., user-entered photographs and/or videos at block 300 and/or as provided by the movie production company along with voice profiles for certain actors for use in training the sound module 410). The 3D models may include pose information and simplified mouth/lip poses for a cartoon version movie ending and movement definition and full mouth/lip animation for movie style movie endings. Additionally, the user is able to extend a movie production company-provided 3D character to be associated with a certain custom user defined animation sequence.

Extras data 608 (objects of importance with physical properties) can also be generated by image segmentation from the 360° panorama shots (or video). Extras data can be generated by the object/background scanning module 416 on either movie production company-provided resources (if other 3D models than already prepared are needed) or by the end user's recorded scanning videos if completely new objects are introduced. This data is used to provide the auto-trained part of a movie specific building blocks model.

FIG. 7 illustrates components of the building blocks module 408. As shown, for each movie for which a personalized movie ending is to be generated, the building blocks module 408 may include a respective sub-module 700. Each sub-module 700 may include a static, pre-trained building block model 702 that outputs data such as described above to a feedback module 704, with a feedback module 704 being associated with a respective individual user as identified by, e.g., speaker recognition according to disclosure above. This allows movie-specific building block models 702 to be added to the library of the building block module 700, with the appropriate model 702 (for the movie being augmented) and feedback module 704 (for the user doing the augmenting) being selected.

The user's narratives select certain outputs of the building blocks model, which is pre-trained with key scenes, characters, objects, and character action/behavior (pre-trained by movie data, thereafter static).

The user's approval or disapproval of the output of the building block model is used to train the deep learning feedback module 704. By refining, altering, or discharging building blocks model outputs, the feedback module 704 trains in the style and vision of the respective user, as well as scene/image composition. Thus, to improve the user's experience, the predictions of the building block model 702 are influenced by the feedback module 704 for the user.

Also, the feedback module 704 can execute unsupervised training on the narrative's interpretation LOD model described previously in the interpretation module to react on less and less descriptive narrations from the user to improve the user experience working with this tool. This would mean if a user starts out a narration with: 'In a living room, with a couch on the left a TV on the right, some easy chairs surrounding a coffee table', after learning it would be enough if the user simply narrated 'the living room' some iterations later. Training results can be tied to a certain user's voice profile, because if there is more than one user working with this tool good predictions for one might be bad ones for another. The user also may be given the option to select to use an already-trained feedback module 704 from another movie into a new one or start out anew.

The building blocks models can be arbitrarily extended by movie companies supplying more models for their movies for movie and/or comic style ending generation (alongside with their sound modules). And they can also be extended by additional users of the tool.

Figure 8:
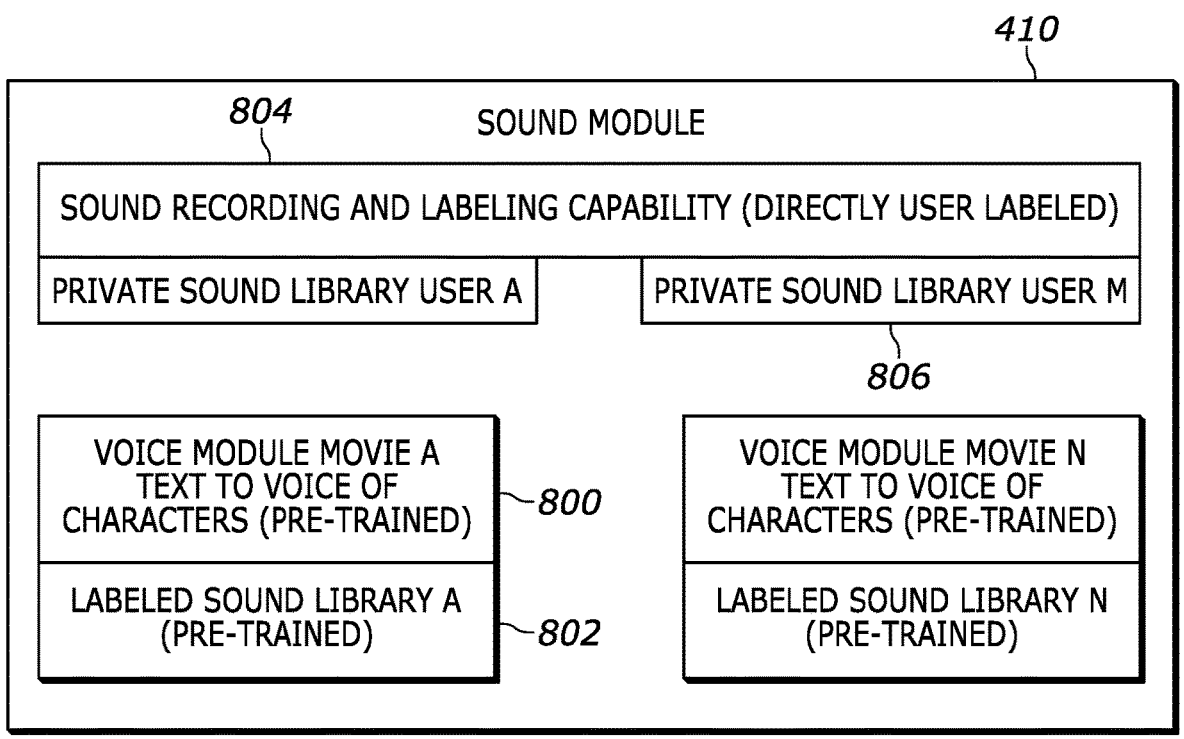
FIG. 8 is a schematic diagram of the sound module of FIG. 4.

FIG. 8 illustrates details of the sound module 410 shown in FIG. 4. The sound module 410 contains movie-specific models 800 for text-to-voice conversion of audio related to specific movie characters and general sound libraries 802. Also, the sound model includes a module 804 that records and labels, by category and character name if desired, sound information received from the interpretation module 402. Each user may be associated with his or her own respective sound library 806.

The composition module 412 receives input from the interpretation module 402, sound module 410 (for generating scripts/dialog of the personalized movie ending) and building blocks module 408 for generating the visual aspect, either cartoon or movie-style, of the movie ending. For the cartoon (or comic) style, the different pictures used for the composite scene image can be repositioned, whereas for the movie-style video version, speech timing and Object/character animation are established by the composition module. Animation and object interaction are processed and fed back to the narrative LOD of the interpretation module as shown. Camera position/viewpoint/movement/zoom are automatically provided and can be changed through another corrective pass (and then can also be added to the interpretation module's LOD).

Since the introduction of the use of an indirectly trained LOD is very user specific in its application (as well as the style and vision models of the user) the user's voice recognition is used to identify all the user specific components of the tool when a certain user is working with it.

Present principles may be used in all possible deep learning-based methods for image, video and audio data processing, among others.

As may be appreciated from the foregoing detailed description, present principles thus improve the adaptation and training of neural networks through the technological solutions described herein.

It will be appreciated that whilst present principals have been described with reference to some example embodiments, these are not intended to be limiting, and that various alternative arrangements may be used to implement the subject matter claimed herein.

The invention claimed is:

1. An apparatus, comprising:
    at least one processor configured with instructions executable by the at least one processor to:
    receive input from at least one input device, the input comprising at least voice input; and
    based at least in part on the input, generate an ending for at least one movie, the ending being related to the input, wherein the voice input comprises:
    first portions of the voice input being narrations describing what characters in the ending would say, second portions of the voice input being instructions for a final composition of the ending, the instructions of the second portions of the voice input comprising one or more of instructions for layering/relative positioning of generated images to be merged into a single frame, instructions for camera location, instructions for speech timing.

2. The apparatus of claim 1, wherein the ending comprises at least one movie clip.

3. The apparatus of claim 1, wherein the input comprises at least one photograph.

4. The apparatus of claim 1, wherein the input comprises at least one video clip.

5. The apparatus of claim 1, wherein the ending is generated by at least one neural network (NN).

6. The apparatus of claim 1, wherein the instructions of the second portions of the voice input comprise instructions for layering/relative positioning of generated images to be merged into a single frame.

7. The apparatus of claim 1, wherein the instructions of the second portions of the voice input comprise instructions for camera location.

8. The apparatus of claim 1, wherein the instructions of the second portions of the voice input comprise instructions for speech timing.

9. An assembly comprising:
    at least one processor configured with instructions to:
    provide input regarding at least one movie to an interpretation model comprising at least a first neural network (NN) to recognize voice signals of the input;
    provide an output of the interpretation module to a sound module to recognize terms in the voice signals of the input;
    provide an output of the interpretation module to a building block module comprising at least a second NN to create scene elements for an ending of the movie; and
    provide an output of the interpretation module, an output of the building blocks module, and an output of the sound module to a composition module to generate the ending of the movie, wherein first portions of the voice input are classified as narrations describing what characters in the ending would say, second portions of the voice input are classified as instructions for a final composition of the ending, the instructions comprising one or more of instructions for layering/relative positioning of generated images to be merged into a single frame, instructions for camera location, instructions for speech timing.

10. The assembly of claim 9, wherein the instructions comprise instructions for layering/relative positioning of generated images to be merged into a single frame.

11. The assembly of claim 9, wherein the instructions comprise instructions for camera location.

12. The assembly of claim 9, wherein the processor is embodied in a network server.

13. The assembly of claim 9, wherein the processor is embodied in a computer simulation console.

14. The assembly of claim 9, wherein the processor is embodied in a computer simulation controller.

15. The assembly of claim 9, wherein the instructions comprise instructions for speech timing.

16. The assembly of claim 9, wherein the ending comprises at least one movie clip.

17. A method, comprising:
    receiving voice input;
    presenting at least one user interface (UI) configured for generating an ending; and
    based at least in part on the voice input and selection from the UI, generating at least one ending to a movie, first portions of the voice input being narrations describing what characters in the ending would say, second portions of the voice input being instructions for a final composition of the ending, the instructions of the second portions of the voice input comprising one or more of instructions for layering/relative positioning of generated images to be merged into a single frame, instructions for camera location, instructions for speech timing.

18. The method of claim 17, wherein the ending comprises at least one cartoon.

19. The method of claim 17, wherein the ending comprises at least one movie clip.

20. The method of claim 17, wherein the instructions of the second portions of the voice input comprise instructions for layering/relative positioning of generated images to be merged into a single frame.

21. The method of claim 17, wherein the instructions of the second portions of the voice input comprise instructions for camera location.

* * * * *